United States Patent
Shuey et al.

[15] 3,700,990
[45] Oct. 24, 1972

[54] BRAKING METHODS AND APPARATUS

[72] Inventors: David R. Shuey, Webster; Roger F. Norian, Williamson, both of N.Y.

[73] Assignee: Xerox Corporation, Stamford, Conn.

[22] Filed: Feb. 25, 1971

[21] Appl. No.: 118,827

[52] U.S. Cl. ...............318/375, 318/369, 318/382
[51] Int. Cl. .................................................H02p 3/14
[58] Field of Search......318/369, 375, 382, 611, 612, 318/613, 614, 254, 138, 265

[56] References Cited

UNITED STATES PATENTS

| | | | |
|---|---|---|---|
| 3,564,367 | 2/1971 | Wanner et al. | 318/369 X |
| 2,767,363 | 10/1956 | Chubb | 318/369 X |
| 3,239,735 | 3/1966 | Raider et al. | 318/614 X |
| 3,345,547 | 10/1967 | Dunne | 318/138 |
| 3,423,658 | 1/1969 | Barrus | 318/254 X |

*Primary Examiner*—Bernard A. Gilheany
*Assistant Examiner*—F. E. Bell
*Attorney*—James J. Ralabate, John E. Beck, Franklyn C. Weiss and Marn & Jangarathis

[57] ABSTRACT

Braking methods and the apparatus therefor are provided in accordance with the teachings of the present invention. According to one embodiment of this invention the rotation of a rotating device is detected and the angular disposition thereof is determined. The relative angular disposition of said rotating device is compared with the time of occurrence of a condition requiring the arrest of said rotating device. A brake signal adapted to produce hysteresis braking of the rotating device is generated in accordance with the comparison, whereby the velocity of said rotating device is rapidly reduced such that said rotating device halts at a desired angular disposition.

25 Claims, 4 Drawing Figures

3,700,990

BRAKING METHODS AND APPARATUS

This invention relates to a method of arresting the rotation of a rotating device and the apparatus therefor, and more particularly, to a method of and apparatus for terminating the rotation of a rotating device at a desired angular position.

Many commercial and industrial applications employing rotating devices, require the rotating device to be halted within a brief interval of time following the occurrence of a condition. The techniques heretofore employed by the prior art to accomplish this have included frictional braking of the rotating device and insertion of mechanical detents into the angular path of said rotating device. These techniques, however, suffer from the common disadvantage of necessitating stringent maintenance requirements to insure the satisfactory operation thereof. In addition, these techniques are exemplified by shock and vibration as well as excessive wear of the mechanical components utilized to halt the rotation of the rotating device. A further disadvantage of such prior art techniques is the inability to predict the angular disposition at which the rotating device will halt.

In facsimile transceivers employing rotating drums, it is preferred to arrest the rotating drum at a desired angular disposition to facilitate various operations thereon. The application of prior art frictional braking techniques to such transceivers, however, has required manual rotation of the drum subsequent to the arrest thereof, until the desired angular disposition is obtained. Alternatively the impact on the drum caused by the prior art mechanical detent apparatus has resulted in damage to critical components of the transceiver requiring costly repairs and resulting in unreliable operation of the transceiver.

Therefore, it is an object of the present invention to provide a method of arresting the rotation of a rotating device within a brief period of time and the apparatus therefor.

It is another object of the present invention to provide a method of and apparatus for the hysteresis braking of a rotating device.

It is a further object of the present invention to provide a method of and apparatus for halting a rotating device at a desired angular disposition thereof.

It is yet another object of the present invention to provide a method of and apparatus for responding to a condition requiring the arrest of a rotating body.

Various other objects and advantages of the invention will become clear from the following detailed description of an embodiment thereof, and the novel features will be particularly pointed out in connection with the appended claims.

In accordance with this invention, the method of terminating the rotation of a rotating device, and the apparatus therefor, is provided wherein the rotating device is driven at a constant angular velocity; the angular disposition of said rotating device is detected and when said rotating device obtains a predetermined angular disposition, a brake signal adapted to produce hysteresis braking of said rotating device is generated, whereby the velocity of said rotating device is rapidly reduced to a zero value when said rotating device obtains a desired angular position.

The invention will be more clearly understood by reference to the following detailed description of an exemplary embodiment thereof, in conjunction with the accompanying drawings in which.

Figure 1:
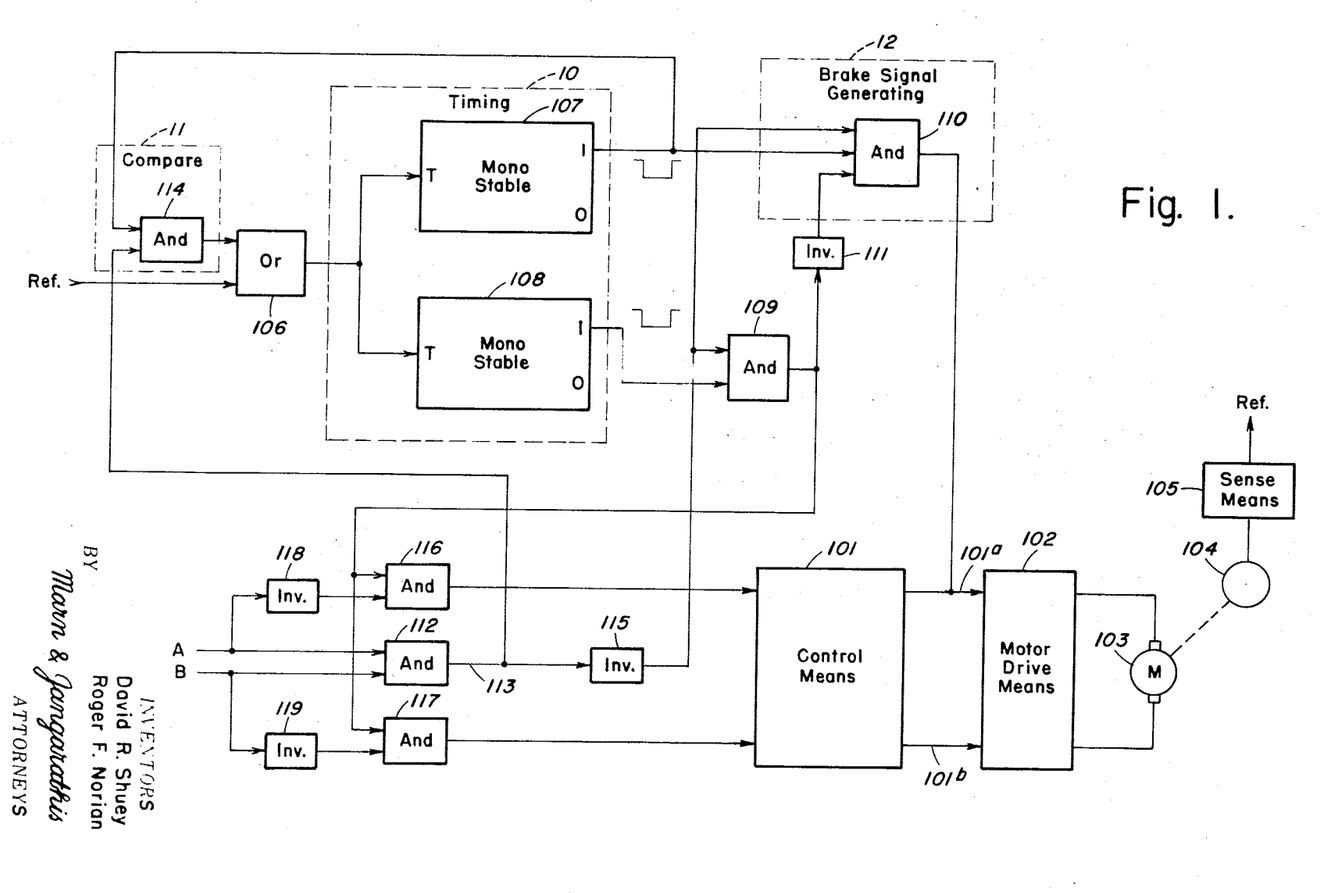
FIG. 1 is a schematic diagram representing the apparatus of the present invention.

Referring now to the drawings and in particular to FIG. 1, there is illustrated a schematic diagram of the present invention, comprising timing means 10, comparing means 11, brake signal generating means 12, control means 101, motor drive means 102, electric motor 103, and rotatable device 104. Control means 101 is coupled to motor drive means 102 and is adapted to provide a source of excitation signal whereby motor drive means 102 is capable of supplying operating energy to the electric motor 103. For example, if said electric motor 103 comprises a DC motor, well known in the prior art, control means 101 may provide a regulated DC signal to motor drive means 102. Alternatively, if the electric motor 103 comprises a conventional synchronous motor, control means 101 may provide an alternating signal of constant frequency to motor drive means 102 via electrical leads 101(a) and 101(b), respectively. Motor drive means 102 is directly coupled to the electrical motor 103 and provides said electric motor with operating energy. Accordingly, motor drive means 102 may apply a direct current to the armature of electric motor 103. If, however, the electric motor 103 comprises a synchronous motor, motor drive means 102 may comprise a conventional push-pull amplifier adapted to provide electric motor 103 with a rotating field. As is well understood by those skilled in the art, the rotor of electric motor 103 will rotate at a synchronous velocity in accordance with the rotating field induced in the stator of electric motor 103.

Rotatable device 104 is mechanically coupled to the rotor of electric motor 103 and rotates therewith. The rotatable device 104 may rotate at the same speed as the electric motor 103 or, if desired, conventional speed reducing gears may be utilized to mechanically couple rotatable device 104 to electric motor 103. Sense means 105 is fixedly disposed relative to rotatable device 104 and is adapted to indicate the angular disposition of said rotatable device 104. Accordingly, rotatable device 104 may include an indexing mark mounted on the periphery thereof, and sense means 105 may include cooperating means to detect the position of said indexing mark. Thus, if the indexing mark comprises an electrically conductive strip, sense means 105 may include an electrical contact adapted to complete an electrical circuit each time said conductive strip rotates into the vicinity of said electrical contact, thereby generating an electrical signal. Alternatively, the indexing mark may comprise a strip of light reflecting material adapted to modulate radiant energy, and sense means 105 may include a photocell responsive to reflected light or modulated radiant energy.

Sense means 105 is coupled to timing means 10 by a conventional OR circuit 106. Timing means 10 is adapted to produce signals at discrete intervals of time subsequent to the activation thereof. Accordingly, timing means 10 may comprise a conventional binary counter supplied with a train of constant frequency pulses whereby an output signal is produced when said counter obtains a predetermined count. Alternatively, timing means 10 may comprise a conventional time delay circuit exhibiting a predetermined time constant. The timing means 10 illustrated in FIG. 1 comprises first and second monostable multivibrators 107 and 108, respectively. Each of said monostable multivibrators admits of a stable output state and a quasi-stable output state, as is appreciated by those skilled in the art. An input terminal of monostable multivibrator 107 is connected in common with the input terminal of monostable multivibrator 108 to OR circuit 106. Monostable multivibrator 107 is adapted to respond to an activating signal applied to the input terminal thereof, whereby said monostable multivibrator assumes its quasi-stable output state for a predetermined period of time dependent upon the time constant thereof. Accordingly, monostable multivibrator 107 may comprise a Schmitt Trigger, a monostable unijunction transistor circuit, a tunnel diode one-shot, or the like, as is known to those skilled in the art. Monostable multivibrator 108 is similar to the aforedescribed monostable multivibrator, and therefore, need not be described in detail. It should be noted, however, that the time constant of monostable multivibrator 108 need not be equal to the time constant of monostable multivibrator 107. As will be described in more detail herein below, the time constant of monostable multivibrator 108 exceeds the time constant of monostable multivibrator 107 by an amount at least equal to the length of time required to reduce the velocity of the rotatable device 104 to zero.

An output terminal of monostable multivibrator 107 is coupled to brake signal generating means 12 and, in addition, to compare means 11. It should be recognized that the signal which may be provided at the output terminal of monostable multivibrator 107 is capable of assuming a first DC level when said monostable multivibrator admits of its stable output state, and a second DC level when said monostable multivibrator admits of its quasi-stable output state. Alternatively, the output terminal of monostable multivibrator 107 may provide a complementary DC signal representative of the output state thereof. Compare means 11 is connected to electrical lead 113 whereby a signal representative of the occurrence of a condition requiring the arrest of the rotating device 104 may be supplied to said compare means. Compare means 11 is comprised of coincidence means 114, such as a conventional AND gate, adapted to detect the coincidence of a signal appearing on electrical lead 113 and a signal appearing at the output terminal of monostable multivibrator 107. It is recognized that coincidence means 114 includes a plurality of input terminals and a single output terminal whereby a signal is produced at said output terminal when signals are simultaneously provided at each of said input terminals. The output terminal of coincidence means 114 is coupled to the commonly connected input terminal of monostable multivibrators 107 and 108, respectively, via OR circuit 106. As will soon become apparent, compare means 11 is adapted to determine the relative time of occurrence of a condition requiring the arrest of the rotatable device 104.

Brake signal generating means 12 is coupled to electrical lead 101(a) and is adapted to apply a brake signal thereto. The brake signal affects an alteration in the source of excitation signal provided by control means 101, resulting in the hysteresis braking of electric motor 103, as will soon be described in detail. It is recognized that, if desired, brake signal generating means 12 may be coupled to electrical lead 101(b); the manner of interconnection is merely one of convenience. It is preferred that the brake signal applied to electrical lead 101(a) admit of a duration equal to a pre-established interval of time. Accordingly, brake signal generating means 12 may comprise conventional switching means responsive to timing signals generated by timing means 10. FIG. 1 illustrates one embodiment of such switching means wherein brake signal generating means 12 comprises coincidence means 110 which may be a conventional AND gate, similar to aforedescribed coincidence means 114. Coincidence means 110 is operable upon the occurrence of a condition requiring the arrest of rotatable device 104 and is coupled at an input terminal thereof to inverting means 115. As will soon be explained, inverting means 115 provides a manifestation of the occurrence of said condition. An additional input of coincidence means 110 is coupled to an output terminal of monostable multivibrator 108 via coincidence means 109 and inverting means 111. The signal provided at the output terminal of monostable multivibrator 108 may assume a first DC level when said monostable multivibrator admits of its stable output state, and said signal may assume a second DC level when said monostable multivibrator admits of its quasi-stable output state. It should be understood that a complementary DC signal representative of the output state of the monostable multivibrator may be provided at said output terminal if so desired. Coincidence means 109 is adapted to detect the stable output state of monostable multivibrator 108 and to provide a signal to the input of coincidence means 110 only if the condition requiring the arrest of rotatable device 104 has occurred. However, as will appear obvious to one skilled in the art from the forthcoming description of the operation of the apparatus of FIG. 1, coincidence means 109 may be omitted.

The apparatus of FIG. 1 thus far described may be satisfactorily employed to halt a rotatable device at a desired angular disposition thereof. One application of the present invention, however, contemplates the regulation of a rotating drum employed in a facsimile transceiver. One skilled in the facsimile transceiver art will recognize that the mode of operation of said transceiver may be represented by a plurality of monitoring signals. The termination of one of said monitoring signals may correspond to a condition requiring the arrest of the rotating drum of said facsimile transceiver. Accordingly, additional apparatus is provided in FIG. 1 to accommodate this contemplated application of the present invention. This additional apparatus comprises coincidence means 112, 116 and 117. Each of said coincidence means may comprise a conventional AND gate. Coincidence means 112 is provided with the aforementioned monitoring signals representing the mode of operation of the facsimile transceiver. For the purposes of simplification, said monitoring signals are here represented as signals A and B, respectively, although it is understood that a multiplicity of monitoring signals may be provided. Accordingly, normal operation of the facsimile transceiver may be represented by a signal on electrical lead 113 indicative of the coincidence of signals A and B. The termination of either signal A or signal B results in a corresponding termination of the signal on electrical lead 113 and a consequent activation of inverting means 115. In addition, coincidence means 116, which may comprise a conventional AND gate, is coupled to inverting means 118 and is responsive to the termination of signal A. In a similar manner, coincidence means 117 is coupled to inverting means 119 and is responsive to the termination of signal B. A further input terminal of coincidence means 116 is connected in common with a further input terminal of coincidence means 117 to the output terminal of coincidence means 109. Each of inverting means 111, 118 and 119 may comprise a conventional sense inverting circuit adapted to perform the operation of logic negation. An output terminal of each of coincidence means 116 and 117 is coupled to control means 101 in a manner to deactivate said control means. Hence, the additional apparatus provided in FIG. 1 is effective to maintain the rotatable device 104 at a desired angular disposition thereof until the monitoring signals A and B indicate the existence of a satisfactory mode of operation.

It should be recognized by those skilled in the art that the apparatus of FIG. 1 is not limited solely to the configuration illustrated therein. For example, the coincidence means may comprise conventional NAND circuits. Furthermore, the components of FIG. 1 may include solid state switching apparatus or conventional relay apparatus if desired.

Figure 2A:
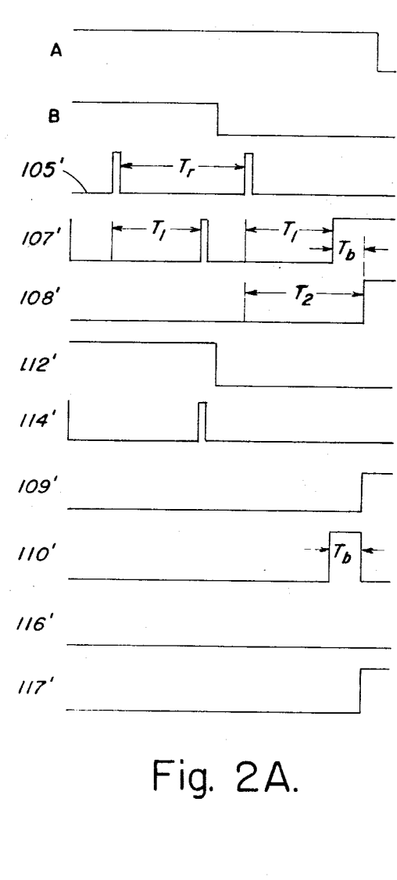
FIGS. 2(a)–2(c) represent characteristic waveforms generated by corresponding components of FIG. 1.

The operation of the apparatus of FIG. 1 will now be described in conjunction with the explanatory waveform diagrams of FIGS. 2(a) through 2(c) wherein primed reference numerals identify the waveforms produced by corresponding elements identified by unprimed reference numerals. Initially, it is assumed that electric motor 103 drives the rotatable device 104 at a constant angular velocity. Accordingly, signals A and B, which may comprise DC levels of a first or second sense, are applied to coincidence means 112. If the electric motor 103 is of the synchronous type, control means 101 applies a source of excitation signal, such as first and second oscillating signals, for example, to motor drive means 102 over electrical leads 101(a) and 101(b). Said first and second oscillating signals may be 180° out of phase with respect to each other. Motor drive means 102 may thus include a conventional push-pull amplifier, to supply a two-phase energizing signal to the stator windings of electric motor 103 which may comprise a load therefor. Consequently, a rotating field is induced in the stator of electric motor 103 thereby urging the rotor to rotate in synchronism therewith. Hence, rotatable device 104 is driven at a constant angular velocity by the electric motor 103. As rotatable device 104 rotates, sense means 105 detects the indexing mark mounted thereon. Accordingly, a reference pulse 105' is generated when said indexing mark rotates through a reference position. Thus the period of the reference pulses, $T_r$, is inversely proportional to the angular velocity of the rotatable device 104 and the time of occurrence of each reference pulse represents a given angular disposition of the rotatable device 104. Each reference pulse is applied to the common connected input terminals of monostable multivibrators 107 and 108 via OR circuit 106, whereupon each of said monostable multivibrators is activated to assume its respective quasi-stable output state. At a first predetermined period of time subsequent to the activation of monostable multivibrator 107, said monostable multivibrator will assume its stable output state, as is recognized by those skilled in the art. At a second predetermined interval of time subsequent to the activation thereof, monostable multivibrator 108 will assume its stable output state. It is here noted that said first predetermined interval of time may be equal to the amount of time required to rotate the rotatable device 104 from said given angular disposition thereof to a predetermined angular disposition. Hence, monostable multivibrator 107 will assume its stable output state when rotatable device 104 assumes a predetermined angular disposition. In other words, the assumption of a stable output state by monostable multivibrator 107 is an indication of the angular disposition of rotatable device 104.

Said second predetermined interval of time exceeds the first predetermined interval of time by an amount at least equal to the length of time required to reduce the velocity of the rotatable device 104 to zero. Hence, if monostable multivibrator 107 is characterized by a delay time $T_1$ then monostable multivibrator 108 may be characterized by a delay time $T_2$ which exceeds $T_1$ by an amount equal to $T_b$.

At a time $T_1$ following the generation of the reference pulse 105' by sense means 105, the rotatable device 104 has obtained an angular displacement equal to $360(T_1/T_r)°$ with respect to said given angular disposition, and monostable multivibrator 107 provides a signal 107' at the output terminal thereof. It is recalled that signal A and signal B are applied to coincidence means 112 and, therefore, coincidence means 112 produces a signal 112' at the output thereof. Hence, signal 107' is applied to coincidence means 114 in coinciding relationship with signal 112'. Consequently, coincidence means 114 generates signal 114' which is applied to the commonly connected input terminals of monostable multivibrators 107 and 108, respectively. Signal 114' activates monostable multivibrator 107 to assume its quasistable output state. In addition, signal 114' is effective to maintain monostable multivibrator 108 in its quasi-stable output state. The assumption of the quasi-stable output state by monostable multivibrator 107 terminates signal 107' to de-energize coincidence means 114, thereby terminating signal 114'.

If now, a condition occurs requiring the arrest of the rotating device 104, that is, if for example signal B terminates, the following occur: Monostable multivibrators 107 and 108 remain in their respective quasi-stable output states, rotatable device 104 continues to rotate and sense means 105 generates a reference pulse 105' upon detecting a given angular disposition of rotatable device 104. As aforedescribed the reference pulse 105' is applied to the common connected input terminals of multivibrators 107 and 108 to maintain said monostable multivibrators in their respective quasi-stable output states. At time T₁ subsequent to the generation of said reference pulse, monostable multivibrator 107 assumes its stable output state as indicated by the signal 107'. It is observed however, that the signal 112' produced by coincidence means 112 has terminated in accordance with the termination of signal B. Accordingly, coincidence means 114 is disabled from providing an activating signal such as the aforedescribed signal 114'. In addition, the termination of signal 112' activates inverting means 115 to apply an input signal to each of coincidence means 109 and 110. Coincidence means 109 is responsive to the stable output state assumed by monostable multivibrator 108 and, therefore, is not provided with a further input signal. Consequently, coincidence means 109 is not energized and the signal 109' supplied thereby is inverted by inverting means 111 and the inverted signal is applied to coincidence means 110. The latter coincidence means is now supplied with an input signal at each input terminal thereof to thereby generate signal 110'. At a time T₂ subsequent to the activation thereof, monostable multivibrator 108 assumes its stable output state whereupon coincidence means 109 is energized to produce signal 109'. Inverting means 111 responds to the energization of coincidence means 109 to de-energize coincidence means 110. Consequently, signal 110' produced by coincidence means 110 and applied to electrical lead 101(a) is terminated. Thus, it is seen that the signal 110' comprises a pulse of duration $T_b$.

Signal 110' is effective to interrupt the first oscillating signal supplied to motor drive means 102 by the electrical lead 101(a). Thus, motor drive means 102 supplies a single phase energizing signal to the stator of electric motor 103, thereby terminating the rotation of the induced field. The rotor of electric motor 103 is comprised of magnetic material, such as an aluminum shaft with cobalt deposits. When the rotor moves through the now stationary magnetic field, the magnetic domains therein are reversed and eddy currents are generated in the rotor. The eddy currents provide a source of braking energy thereby reducing the inertial energy of the rotor to zero. This phenomenon is known as hysteresis braking. It is understood that the time required to terminate the rotation of the electrical motor by means of hysteresis braking is dependent upon the strength of the stator field, the angular velocity of the motor and the inertia thereof, and, therefore, is fixed. It is further understood that if a condition requiring the arrest of the rotatable device 104 occurs subsequent to the rotation of said rotatable device through the predetermined angular disposition, hysteresis braking, if then applied to the rotatable device, will halt the rotation thereof at a disposition other than said desired angular disposition. Thus, if hysteresis braking is commenced only when the electric motor 103 (or the rotatable device 104 mechanically coupled thereto) obtains a predetermined angular disposition, the electric motor 103 (and, correspondingly the rotatable device 104) will be braked to a halt at a desired angular disposition. It is now readily apparent that the apparatus of FIG. 1 initiates the process of hysteresis braking when rotating device 104 obtains a predetermined angular disposition, i.e., when monostable multivibrator 107 assumes its stable output state.

When monostable multivibrator 108 assumes its stable output state, signal 109' is initiated and signal 110' terminates. The signal 109' is provided as an input signal to each of coincidence means 116 and 117. Whereas signal B has terminated, thereby representing the aforedescribed condition requiring the arrest of the rotatable device 104, inverting means 119 provides a further input signal to coincidence means 117. Hence, the latter coincidence means is activated to provide signal 117' to control means 101. Signal 117' is effective to inhibit control means 101 from supplying oscillating signal to electrical leads 101(a) and 101(b). Consequently, control means 101 may include conventional means which are deactivated in response to signal 117'. Thus, it is seen that the rotatable device 104 is restrained from further rotation until the prerequisite operating conditions are restored.

Figure 2B:
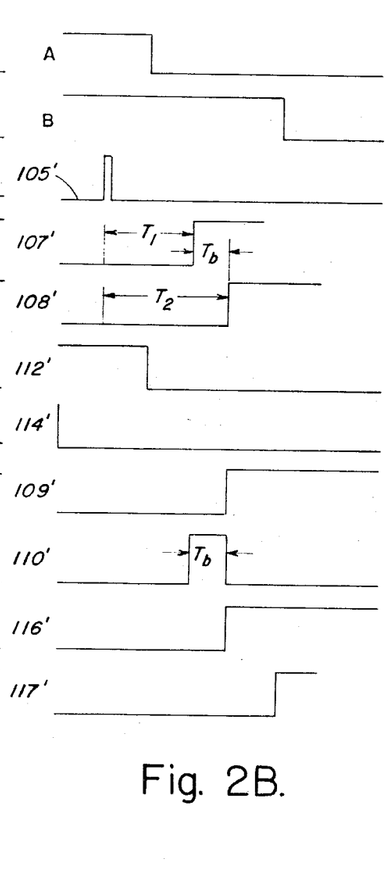
Figure 2C:
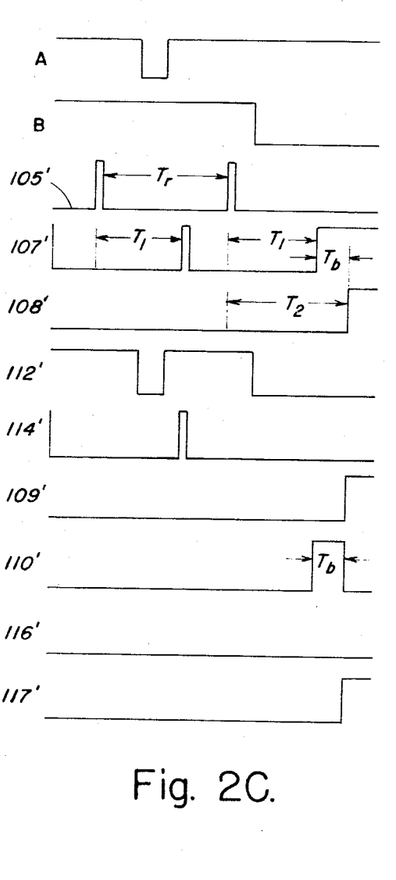

Let it now be assumed that the conditions described by FIG. 2(b) occur. Sense means 105 produces reference pulse 105' upon detecting a given angular disposition of rotatable device 104. The reference pulse is applied to the commonly connected input terminals of monostable multivibrators 107 and 108 by OR circuit 106. The applied reference pulse 105' activates each of the respective monostable multivibrators to assume its quasi-stable output state. If a condition requiring the arrest of rotatable device 104 occurs, that is, if for example, signal A terminates, the signal 112' produced by coincidence means 112 terminates. Accordingly, the inverting means 111 responds to the de-energization of coincidence means 109 to apply a signal to coincidence means 110 in response to the quasi-stable output state assumed by monostable multivibrator 108. At time T₁ subsequent to the generation of the reference pulse 105', monostable multivibrator 107 assumes its stable output state. However, the termination of signal 112' inhibits coincidence means 114 from responding to signal 107'. Consequently, the commonly connected input terminals of monostable multivibrators 107 and 108 are not supplied with an activating signal by coincidence means 114. Therefore, coincidence means 110 is provided with signal 107', the inverse of signal 109' and an enabling signal applied thereto by inverting means 115. Accordingly, signal 110' is applied to electrical lead 101(a), resulting in the hysteresis braking of electric motor 103. At time T₂ subsequent to the activation thereof, monostable multivibrator 108 assumes its stable output state to thereby activate coincidence means 109. The signal 109' is inverted by inverting means 111 whereupon signal 110' terminates. The signal 109' produced in response to the activation of coincidence means 109 enables coincidence means 116 and 117 to respond to the termination of signal A and signal B, respectively. Whereas the condition requiring the arrest of the rotatable device 104 has been assumed to be the termination of signal A, inverting means 118 energizes coincidence means 116 to produce signal 116'. Signal 116' is applied to control means 101 and, in the manner aforedescribed with respect to signal 117', said control means 101 is inhibited from supplying oscillating signals to electrical leads 101(a) or 101(b). It is understood that, whereas coincidence means 116 and 117 are adapted to respond to the termination of signals A and B, respectively, and whereas monostable multivibrator 108 is adapted to assume its stable output state only upon the termination of signal A or signal B, the output terminal of monostable multivibrator 108 may be coupled directly to coincidence means 116 and 117.

It should now be readily apparent that monostable multivibrator 107 and coincidence means 114 admit of a cooperating relationship whereby the relative angular disposition of the rotatable device 104 is determined at the time of occurrence of a condition requiring the arrest of said rotating device. Thus, signal 114' indicates that rotatable device 104 has obtained a predetermined angular disposition and neither signal A nor signal B has terminated. Accordingly, hysteresis braking of the electric motor 103 is inhibited and the timing means 10 is reset to an initial condition. It is further recognized that once signal A or signal B has terminated, the hysteresis braking of electric motor 103 is not commenced until rotatable device 104 obtains said predetermined angular disposition. Hence, the selective termination of signal A or signal B in accordance with the present invention results in the halting of rotatable device 104 at a desired angular disposition thereof.

An additional feature of the present invention is the capability thereof to accurately discriminate between momentary interruptions of signal A or signal B and the actual termination of said signals. FIG. 2(c) illustrates a discontinuance present in signal A. Accordingly, signal 112' produced by coincidence means 112 includes a coinciding discontinuance therein. The discontinuity in signal 112' activates inverting means 115 to enable coincidence means 109 to respond to the stable state assumable by monostable multivibrator 108. Accordingly, signal 109', which is now representative of the quasi-stable output state assumed by monostable multivibrator 108, is inverted by inverting means 111 and applied to coincidence means 110. However, the quasi-stable output state assumed by monostable multivibrator 107 is effective to inhibit coincidence means 110 from responding to the inverted signal supplied thereto. Hence, coincidence means 110 does not apply a braking signal to electrical lead 101(a). However, when monostable multivibrator 107 assumes its stable output state at time $T_1$ subsequent to the generation of the reference pulse signal 105', signals A and 112', respectively, have been restored. Consequently, coincidence means 114 responds to signals 107' and 112', simultaneously applied thereto, to produce signal 114'. As is now appreciated, this latter signal activates monostable multivibrator 107 whereby said monostable multivibrator assumes its quasi-stable output state, and signal 107' produced thereby is promptly terminated. In addition, monostable multivibrator 108 is activated by signal 114' to maintain its quasi-stable output state. Timing means 10 has thus been reset to its initial condition.

The rotatable device 104 continues to rotate and when a given angular disposition is obtained thereby, sense means 105 generates reference pulse 105'. The reference pulse 105' is applied to the commonly connected input terminals of monostable multivibrators 107 and 108 via OR circuit 106, to maintain said monostable multivibrators in their respective quasi-stable output states. If now, signal B terminates, thereby requiring the arrest of rotatable device 104, coincidence means 112 is de-energized and signal 112' produced thereby is terminated. Inverting means 115 responds to the termination of signal 112' to enable coincidence means 109 to detect the stable output state assumable by monostable multivibrator 108. It is appreciated that the termination of signal 112' inhibits the concidence means 114 from responding to the signal 107' produced when monostable multivibrator 107 assumes its stable output state at time $T_1$ subsequent to the occurrence of the generated reference pulse 105'. Accordingly, when the rotatable device 104 obtains the predetermined angular disposition coincidence means 110 is provided with signal 107', an inversion of the deactivated signal 109' and an enabling signal produced by inverting means 115. Consequently, signal 110' is generated and applied to electrical lead 101(a) to initiate hysteresis braking of electric motor 103. At time $t_2$ subsequent to the generation of the reference pulse 105', monostable multivibrator 108 assumes its stable output state whereby coincidence means 109 is energized. Coincidence means 110 responds to the initiation of signal 109' and is correspondingly disabled; signal 110' produced thereby is terminated. As is now fully understood the initiation of signal 109' is effective to enable coincidence means 116 and 117 to respond to the selective termination of signal A or signal B, respectively.

Thus, it is seen that the apparatus of the present invention is adapted to sense the rotation of rotatable device 104, to produce a braking signal of pre-established duration when said rotatable device obtains a predetermined angular disposition, to provide for the hysteresis braking of said rotatable device to a halt in response to said braking signal, and to inhibit the production of said braking signal if said rotatable device obtains said predetermined angular disposition prior to the occurrence of a condition requiring the arrest of said rotatable device. One skilled in the art will recognize that the present invention admits of complementary logic circuits comprised of NAND and NOR networks, if desired. In addition, monostable multivibrator 107 may be omitted if additional sensing means are provided to detect the predetermined angular disposition of rotatable device 104. It is further understood that the duration $T_b$ of signal 110' must be at least equal to the time required to terminate the rotation of rotatable device 104 as said rotatable device 104 rotates from the predetermined angular position thereof to a desired angular position. Accordingly, the duration $T_b$ is dependent upon the strength of the stator field of electric motor 103, and the inertia of the motor and load coupled thereto. It is here noted that the monostable multivibrators may be provided with means well known in the art to alter the respective time constants thereof. Hence, if the electric motor 103 rotates at an increased angular velocity, the time constant of monostable multivibrator 107 may be reduced such that the signal 107' nevertheless corresponds to the angular disposition obtained by rotatable device 104. Similarly, the time constant of monostable multivibrator 108, which is determinative of the duration $T_b$ of signal 110', may be varied to accommodate adjustments in the time required to reduce the velocity of the rotatable device 104 to zero.

While this invention has been particularly shown and described with reference to an exemplary embodiment thereof, it will be obvious to those skilled in the art that the foregoing and various other changes and modifications in form and details may be made without department from the spirit and scope of the invention. It is therefore intended that the appended claims be interpreted as including all such changes and modifications.

What is claimed is:

1. A method of arresting the rotation of a rotating device comprising the steps of:
    driving said rotating device at a given angular velocity;
    determining the angular disposition of said rotating device;
    defining an interval of time required to rotate said rotating device from said determined angular disposition to a desired angular disposition, said interval of time being sufficient to enable the angular velocity of said rotating device to be reduced to zero when said rotating device exhibits said desired angular disposition; and
    generating a braking signal in accordance with said defined interval of time when a condition requiring the arrest of said rotating device has occurred, to effect hysteresis braking of said rotating device whereby a braking torque is produced to reduce the angular velocity of said rotating device such that said rotating device halts at said desired angular disposition.

2. The method of claim 1 wherein said step of determining the angular disposition of said rotating device comprises the steps of:
    detecting the rotation of said rotating device through a reference position; and
    selectively producing a first or second signal a predetermined period of time thereafter in accordance with the occurrence of said condition requiring the arrest of said rotating device, whereby said first signal is produced if said condition has occurred, and said second signal is produced if said condition has not occurred.

3. The method of claim 2 wherein said step of defining an interval of time required to rotate said rotating device from said determined angular disposition to a desired angular disposition comprises the steps of:
    producing a third signal in response to the detected rotation of said rotating device through said reference position, said third signal terminating within a pre-established interval of time subsequent to the selective production of said first signal; and
    inhibiting the termination of said third signal when said second signal is selectively produced.

4. The method of claim 3 wherein said step of generating a braking signal comprises combining said first and third signals whereby a braking signal admitting of a duration equal to said pre-established interval of time is generated at said predetermined period of time subsequent to the rotation of said rotating device through said reference position.

5. The method claim 1 wherein said step of generating a braking signal comprises the steps of:
    detecting the occurrence of a condition requiring the arrest of said rotating device;
    comparing the time of occurrence of said condition with the angular disposition of said rotating device at said time of occurrence; and
    selectively generating a braking signal of pre-established time duration during said defined interval of time when said condition occurs prior to the rotation of said rotating device through said predetermined angular disposition.

6. The method of claim 5 wherein said step of comparing the time of occurrence of said condition with the angular disposition of said rotating device comprises the steps of:
    providing a first d.c. signal at a predetermined period of time following the rotation of said rotating device through a determined position, said predetermined period of time corresponding to a predetermined angular displacement of said rotating device; and
    inhibiting said first d.c. signal if said rotating device obtains said predetermined angular displacement prior to the occurrence of said condition.

7. The method of claim 6 wherein said step of selectively generating a braking signal comprises the steps of:
    providing a second d.c. signal, said second d.c. signal terminating at an interval of time subsequent to the rotation of said rotating body through said determined position, said interval of time being equal to said defined interval of time; and
    generating a signal indicative of the coincidence of said first and second d.c. signals.

8. Apparatus for terminating the rotation of a rotating device in response to the occurrence of a condition such that said rotating device halts at a desired angular position, comprising:
    an energizable electric motor for driving said rotating device at a constant speed;
    indicating means for producing signals indicative of the angular position of said rotating device;
    signal generating means coupled to said indicating means and responsive to said produced signals for generating a brake signal when said rotating device admits of a predetermined angular position; and
    means responsive to said brake signal for de-energizing said electric motor, thereby producing hysteresis braking of said electric motor whereby the speed of said rotating device is reduced to a zero value when said rotating device obtains said desired angular position.

9. The apparatus of claim 8 wherein said indicating means comprises:
    sensing means for sensing the rotation of said rotating device through a reference position; and
    timing means coupled to said sensing means and activated thereby to produce signals at discrete intervals of time subsequent to the activation of said timing means, said discrete intervals of time being related to said speed of rotation of said rotating device.

10. The apparatus of claim 9 wherein said signal generating means comprises:
    comparing means for comparing the relative time of occurrence of said condition with the angular position of said rotating device;
    means coupled to said comparing means for inhibiting the signals produced by said timing means when said rotating device obtains said predetermined angular position prior to the occurrence of said condition; and combining means coupled to said timing means and responsive to said condition for generating a braking signal having a duration determined by said intervals of time.

11. The apparatus of claim 10 wherein said timing means comprises:
a first timing circuit adapted to be selectively activated by said sensing means and said comparing means, and operable to provide a first signal at a first predetermined period of time subsequent to the activation thereof; and
a second timing circuit adapted to be selectively activated by said sensing means and said comparing means, and operable to provide a second signal at a second predetermined period of time subsequent to the activation thereof, said second predetermined period of time exceeding said first predetermined period of time by an amount at least equal to the length of time required to reduce the speed of said rotating device to zero.

12. The apparatus of claim 11 wherein said combining means comprises coincidence detecting means coupled to said first and second timing circuits and adapted to produce a d.c. signal upon detecting the coincidence of said first signal and said condition, and to terminate said d.c. signal upon detecting the coincidence of said first and second signals, whereby said d.c. signal is effective to de-energize said electric motor to produce hysteresis braking thereof.

13. The apparatus of claim 9 wherein said timing means comprises:
a first monostable multivibrator admitting of a stable output state and a quasi-stable output state, and adapted to assume its quasi-stable output state for a first predetermined period of time in response to an activating signal applied thereto; said first predetermined period of time being equal to the time required to rotate said rotating device from said reference position to said predetermined angular position;
a second monostable multivibrator connected in common with said first monostable multivibrator and admitting of a stable output state and a quasi-stable output state, said second monostable multivibrator being adapted to assume its quasi-stable output state for a second predetermined period of time in response to an activating signal applied thereto, said second predetermined period of time exceeding said first predetermined period of time by an amount at least equal to the time required to terminate the rotation of said rotating device as said rotating device rotates from said predetermined angular position to said desired angular position; and
activating means coupled to said commonly connected first and second monostable multivibrators to apply activating signals thereto.

14. The apparatus of claim 13 wherein said activating means comprises:
comparing means for comparing the relative time of occurrence of said condition with the angular position of said rotating device and adapted to produce a signal if said rotating device obtains said predetermined angular position prior to the occurrence of said condition; and
means coupled to said comparing means and said sensing means for selectively applying an activating signal to said commonly connected first and second monostable multivibrators when said comparing means produces said signal and when said rotating device rotates through said reference position.

15. The apparatus of claim 14 wherein said comparing means comprises coincidence means coupled to said first monostable multivibrator for indicating the coincidence of the stable output state assumed by said first monostable multivibrator and a signal representative of the occurrence of said condition, whereby said coincidence means is inhibited when said condition occurs.

16. The apparatus of claim 14 wherein said signal generating means comprises switching means coupled to said first and second monostable multivibrators and activated by said condition for generating said brake signal when said first monostable multivibrator admits of its stable output state and said second monostable multivibrator admits of its quasi-stable output state.

17. A motor control system for regulating the operation of an electric motor comprising:
motor drive means coupled to said electric motor for supplying said electric motor with operating energy;
sensing means for sensing the rotation of said electric motor;
means for producing a motor halt signal;
means responsive to said sensing means for determining the relative angular disposition of said electric motor at the time of occurrence of said motor halt signal;
brake signal generating means responsive to said determination for generating a brake signal when said electric motor rotates into a predetermined angular disposition;
means for applying said brake signal to said motor drive means for altering the operating energy supplied to said electric motor whereby hysteresis braking of said electric motor is effected such that said electric motor is halted at a desired angular disposition; and
supply termination means coupled to said motor drive means for terminating the operating energy supplied to said electric motor subsequent to the halting of said electric motor.

18. A motor control system in accordance with claim 17 wherein said means for determining the relative angular disposition of said electric motor comprises:
means for producing a signal when said electric motor rotates into said predetermined angular disposition; and
coincidence means for detecting the coincidence of said produced signal and said motor halt signal, whereby said produced signal is immediately terminated upon a failure to detect coincidence.

19. A motor control system in accordance with claim 18 wherein said brake signal generating means comprises means responsive to said coincidence means for generating a d.c. signal of pre-established duration upon a detection of coincidence, said pre-established duration being at least equal to the time required to terminate the rotation of said electric motor as said electric motor rotates from said predetermined angular disposition to said desired angular disposition.

20. A motor control system in accordance with claim 19 wherein said motor drive means comprises excitation means for supplying said electric motor with a rotating field whereby said electric motor rotates in synchronism with said rotating field; said excitation means being responsive to said d.c. signal to supply said electric motor with a stationary field.

21. In a facsimile transceiver including a rotating drum, apparatus for halting said drum at a desired angular position thereof, comprising:
  an electric motor supplied with operating energy for driving said drum at a constant speed;
  means for producing a halt signal requiring the halting of said drum;
  means for sensing the rotation of said drum and for determining the relative angular disposition of said drum at the time of occurrence of said halt signal;
  brake signal generating means responsive to said sensing means for generating a brake signal when said drum rotates into a predetermined angular disposition; and
  means responsive to said brake signal for altering the operating energy supplied to said electric motor, thereby producing hysteresis braking of said electric motor such that the speed of said drum is reduced to a zero value when said drum obtains said desired angular position.

22. The apparatus of claim 21 wherein said means for sensing comprises:
  means for producing a signal when said drum rotates into said predetermined angular disposition;
  comparing means for comparing the occurrence of said produced signal and the occurrence of said halt signal; and
  means coupled to said comparing means for inhibiting said produced signal when said drum obtains said predetermined angular disposition prior to the occurrence of said halt signal.

23. The apparatus of claim 22 wherein said brake signal generating means comprises means responsive to said produced signal when said halt signal is produced prior to the time said drum obtains said predetermined angular disposition for generating a d.c. signal of pre-established duration, said preestablished duration being at least equal to the time required to terminate the rotation of said drum as said drum rotates from said predetermined angular disposition to said desired angular position.

24. The apparatus of claim 23 wherein said electric motor is supplied with a rotating field by excitation means, whereby said electric motor rotates in synchronism with said rotating field, said excitation means being responsive to said d.c. signal to supply said electric motor with a stationary field.

25. The apparatus of claim 24 wherein said means for producing a signal when said drum rotates into said pre-determined angular disposition comprises timing means activated by the rotation of said drum through a reference position to produce a signal at a discrete interval of time subsequent to the activation thereof, said discrete interval of time being related to the speed of rotation of said drum.

* * * * *